United States Patent Office 2,916,434
Patented Dec. 8, 1959

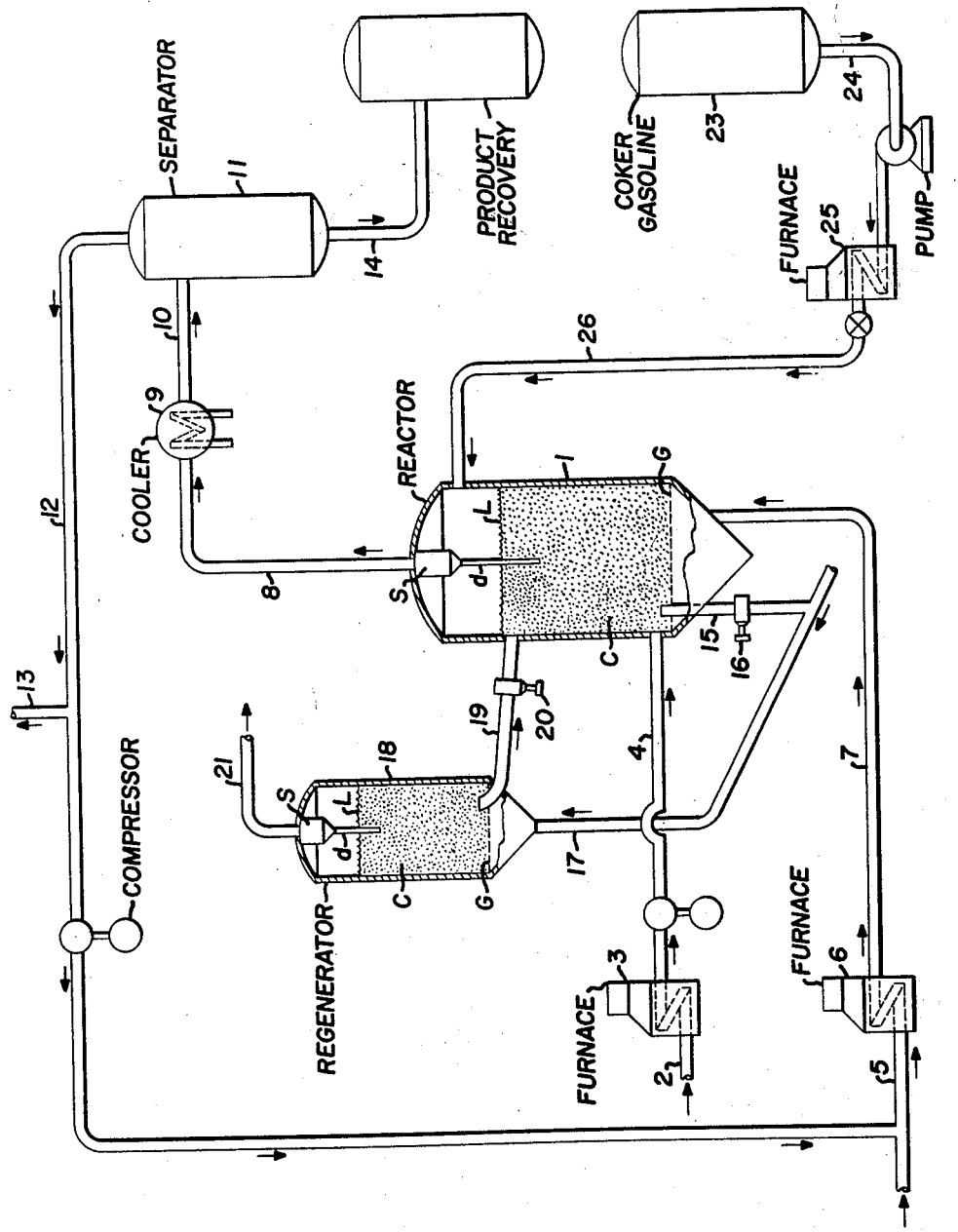

2,916,434

METHOD FOR SIMULTANEOUS HYDROFORM-ING AND HYDRODESULFURIZING DISSIMILAR FEED STOCKS

Kenneth Earl Draeger and Lloyd Arthur Nicolai, Baton Rouge, La., assignors to Esso Research and Engineering Company, a corporation of Delaware Application January 3, 1956, Serial No. 557,110

4 Claims. (Cl. 208—66)

The present invention relates to improvements in motor fuel and gasoline manufacture. More particularly, the present invention involves a combination process wherein a naphtha is hydroformed in the presence of a dense fluidized bed of a hydroforming catalyst in a hydroforming zone and at the same time an unstable gasoline, such as coker gasoline, is subjected to a hydrofining in the dilute phase suspension of catalyst in vaporiform material, which dilute phase suspension is disposed in the upper portion of the hydroforming zone.

In order to meet the requirements of motor fuel for use in modern high compression automobile engines, the industry has found it necessary to upgrade virgin and other naphthas. The most common method of accomplishing this result, in modern refinery practice, is to subject a naphtha to treatment at elevated temperatures and pressures in the presence of a catalyst containing a hydrogenation-dehydrogenation component and added hydrogen. This treatment involves mainly the dehydrogenation of naphthenes in the said naphtha to convert the said naphthenes to the corresponding aromatics. There is also some conversion of normal paraffins to isoparaffins, and some aromatization of paraffins, such as where normal heptane is cyclisized to methylcyclohexane and then, by dehydrogenation of the ring, toluene is formed. Some hydrocracking also occurs in this hydroforming process. The catalyst mainly used in commercial hydroforming at the present time contains a platinum group metal, such as platinum itself, or a VI group metal oxide such molybdenum oxide as the dehydrogenation component which component is carried on a spacing agent such as an active form of alumina. Good results are obtained by employing temperatures in the hydroforming zone of from about 900°–965° F., pressures of from 50–700 p.s.i.g., feed rates of from about 0.1–5.0 wt. oil/hr./lb. of catalyst in the reactor. A hydrogen-containing gas is fed to the reaction zone in amounts of from about 200–6000 s.c.f./bbl. of oil feed, the concentration of hydrogen in the hydrogen-containing gas being from about 50–95%.

As pointed out previously, the present invention laso provides means for stabilizing an unstable gasoline. It is now a matter of record and commercial practice to subject topped or reduced crude to what is known as coking. In this coking operation the heavy or high boiling petroleum residue is subjected to a thermal treatment to cause cracking of the heavy or high boiling materials to form products boiling in the gasoline boiling range, the gas oil boiling range, the kerosene boiling range, etc., in other words, more useful products. The products boiling in the gasoline boiling range are unstable due to the fact that they contain olefins and, particularly, diolefins, which unsaturated material, in storage, tends to form gummy materials which, of course, are undesirable. The present invention involves subjecting gasoline or other unsaturated hydrocarbon-containing material to the influence of hydrogen and powdered catalyst contained in a dilute catalyst suspension in a vessel in which a dense suspension of catalyst promotes hydroforming in a lower portion of said vessel or case. In this manner, therefore, and in a single confined space, hydroforming and hydrofining occur, and important economies are thus effected in the matter of equipment and utilities, all of which will appear more fully hereinafter.

Heretofore and prior to the present invention it has been proposed to subject unstable gasoline to a so-called hydrofining operation in which the product is treated at temperatures of about 800°–850° F. with hydrogen in the presence of a supported cobalt molybdate catalyst whereby the product is hydrogenated at least to the extent that diolefins are converted to mono-olefins, and sulfur is removed from the product. This procedure, of course, involves additional equipment and facilities for reheating, cooling, transference, etc. of the unstable material and the hydrogen, and a bed of catalyst.

An object of the present invention is to refine a raw unstable petroleum product by a method which is cheaper than those which have been heretofore proposed.

Another object of the present invention is to stabilize a raw petroleum product in the same vessel or confined space utilizing the same catalyst as employed in a hydroforming process, manipulating the process in such a manner as to require very little additional auxiliary apparatus and utilities, over and above that required for the hydroforming process, and otherwise conducting both procedures in a more practical and efficient manner.

Other objects of the invention will appear from the following more detailed description and claims.

In brief compass, the present invention relates to a naphtha to be hydroformed in the presence of a fluidized bed of catalytic material and hydrogen in a reaction zone; and in the same vessel in a dilute phase suspension of catalyst in vaporiform material, superposed on said dense phase, unstable gasoline or other material requiring treatment is fed to said dilute phase suspension wherein hydrogen and catalyst present therein cause saturation of olefinic material and sulfur removal.

In the accompanying drawing there is shown diagrammatically the essential components of a plant in which a preferred modification of the present invention may be carried into effect.

Similar reference characters apply to similar parts.

Referring in detail to the drawing, 1 represents a hydroforming reactor containing a body of fluidized catalyst C, which is disposed within the reactor in the space between gas distributor G and an upper dense phase level L. A naphtha which may be preheated in the system, for example, by heat interchange with the hot products or with the fumes from the regeneration zone is passed from line 2 through a furnace 3, and thence passed via line 4 into the bed of catalyst C. Simultaneously, a "recycle gas," that is to say, gas rich in hydrogen recovered from the product recovery system which may also be preheated in the system in the manner described above is passed via line 5, through a furnace 6, wherein it is heated and thence passed via line 7 into the bottom of reactor 1. Under conditions more fully explained hereinafter in the form of a specific example, the desired hydroforming reaction occurs and the crude product is withdrawn from the dense fluidized bed C and passes through a dilute phase extending from L to the top of the reactor. In this space, which contains a dilute suspension of catalyst in gasiform material, the main bulk of the catalyst is separated from the gasiform material and gravitated toward the dense fluidized bed C. Before the product is withdrawn from the reactor, it is forced through one or more gas-solids separating devices S wherein entrained solids are separated and returned to the dense fluidized bed C through one or more dip pipes d.

The product is withdrawn from reactor 1 via line 8 and passed through a cooling means 9 wherein it is cooled at a temperature sufficiently low to condense substantially all of the normally liquid constituents. In other words, the product is cooled to a temperature of about 100° F. The cooled product is withdrawn from cooling means 9, through line 10 and charged to a separator 11. Overhead from separator 11, recycle gas is recovered through line 12 and returned to line 5. A portion of this gas may be withdrawn from the system through line 13. The crude product is withdrawn from the bottom of separator 11, through line 14 and delivered to a product recovery system wherein it is subjected to distillation and other conventional treatment to recover gasoline constituents of improved octane number.

Referring again to reactor 1, the catalyst therein acquires, during use, carbonaceous and other deposits which require that these be removed to maintain the catalyst in an active state. The catalyst is, therefore, withdrawn either continuously or intermittently through a standpipe 15, controlled by a slide valve 16 and charged into an air stream in line 17 wherein it is formed into a suspension and carried into a regenerator 18. In regenerator 18, the catalyst is formed into a dense fluidized bed C by the upflowing regeneration gas, which bed extends from a gas distributing means G to an upper dense phase level L. Under known conditions of temperature, pressure and residence time in the regenerator, the catalyst undergoes oxidative regeneration, and the regenerated catalyst is returned to reactor 1 via standpipe 19, controlled by a slide valve 20. The regeneration fumes pass from the dense fluidized bed C through a dilute phase disposed between L and the top of the regenerator in which space the main bulk of the catalyst is separated from the regeneration fumes. Before the fumes are withdrawn from the regenerator, they are forced through one or more gas-solid separating devices S wherein catalyst still entrained in the said fumes are removed therefrom and returned to the bed C through one or more dip pipes d. The regeneration fumes are withdrawn overhead from the regenerator through line 21. The chemical and sensible heat contained in these fumes may be employed in the present system to preheat the oil feed and/or the recycle gas in means not shown.

Thus a suitable plant for carrying out a hydroforming operation, using the fluidized catalyst technique, has been described.

As previously indicated, the present invention includes the combination process in which advantage is taken of the fact that in the dilute phase suspension of catalyst in the upper portion of the hydroforming zone the catalyst and the temperature conditions are conducive to hydrogeneration of olefins, particularly diolefins. The present invention takes advantage of that condition and injects an unstable gasoline, such as coker gasoline, cracked gasoline, etc., in order to subject it to a hydrofining treatment. Toward this end gasoline from drum 23 is withdrawn through line 24, forced through a pump and thence charged to a heating means 25, such as a fired coil, wherein the said gasoline is heated to a temperature of about 400° F. and thence withdrawn from the said heating means via line 26 and charged to reactor 1 at an upper point thereof. Under the conditions existing in the upper portion of reactor 1, the olefins and diolefins contained in the unstable gasoline are saturated, at least to the extent that the diolefins are substantially converted to mono-olefins. The thus treated gasoline passes with the hydroformed product from the reactor through line 8 condensed, separated from the recycled gas and collected in the product recovery drum together with the hydroformed product.

In order to further describe the present invention the following specific example is set forth.

EXAMPLE

A virgin naphtha boiling within the range of from 200°–350° F., which had a CFR–R octane rating of 59, was hydroformed in the presence of a catalyst consisting of 10 wt. percent $MoO_3$ and 90 wt. percent eta alumina at an average temperature of about 950° F., while maintaining the reaction under pressure of about 200 p.s.i.g. and in the presence of hydrogen fed to the reaction zone at a rate of about 4000 s.c.f./bbl. of naphtha feed while the residence time of naphtha in contact with the catalyst corresponded to an oil feed rate of 1 lb. of oil/hr. of catalyst in the reactor. The yield of 78 vol. percent based on feed is obtained when the product has a CFR–R octane rating of 96.

A coker naphtha, which was produced in known manner by coking a topped crude petroleum oil stock in the presence of a fluidized bed of hot solids, had the following inspection.

*Table I*

| | |
|---|---|
| General Motors gum,[1] mg./100 cc. | 40 |
| Bromine No. | 106 |
| Peroxide No. | 15 |

[1] This test is similar to the ASTM gum test, except that a higher temperature is used (345–360° F.).

This coker naphtha may be fed to reactor 1 via line 26 in the ratio of about one liquid volume of said coker naphtha to four volumes of naphtha fed via line 7 to reactor 1 to be hydroformed. The average temperature existing in reactor 1 in the space above L was about 600° F. and the pressure was about 200 p.s.i.g. and the residence time of the said coker naphtha was 25 seconds. An inspection of the total product is as follows:

*Table II*

| | |
|---|---|
| General Motors gum, mg./100 cc. | 4 |
| Bromine No. | 20 |
| Peroxide No. | 1 |

In a separate run in which the untreated coker naphtha feed was admitted to the hydroformed product, the blend has the following inspection.

*Table III*

| | |
|---|---|
| General Motors gum, mg./100 cc. | 11 |
| Bromine No. | 27 |
| Peroxide No. | 5 |

The data in the above tabulations show that in all inspection tests relating to stability, the coker gasoline was substantially improved. The hydrofining conditions employed in the above tests were relatively mild and, where further improvement in stability is desired, it could be obtained by charging coker naphtha to the dilute phase suspension of catalyst in a lower proportion with respect to the naphtha feed to be hydroformed, that is to say, feeding the coker naphtha to the reactor in the ratio of from say 6–10 liquid volumes of naphtha to be hydroformed per one volume of coker naphtha to be stabilized. Also the coker naphtha to be hydrofined could be preheated to a higher temperature before delivery to the reactor. It is pointed out that the introduction of coker naphtha feed to reactor 1 via line 22 has the effect of cooling the vapors in the space above L, thus reducing the tendency of the raw hydroformate to undergo hydrocracking.

To recapitulate briefly, the present invention contemplates a combined hydroforming and hydrofining of an unstable naphtha or gasoline, such as coker gasoline, cracked gasoline, etc. in a single vessel containing a dense fluidized bed of a hydroforming catalyst superimposed by a dilute phase suspension of said catalyst in vapors, the hydrofining being performed in the upper portion of the said vessel. The hydroforming operation per se was conducted under normal conditions. The temperature conditions in the dilute phase wherein the hydrofining occurs may vary from 500°–800° F. and the ratio of naphtha hydroformed to that hydrofined in the process indicated may vary from 2–10 liquid volumes of naphtha to be hydroformed per volume of naphtha to be stabilized by hydrofining. The present process reduced the amount of equipment and facilities necessary where the hydroforming and the hydrofining are performed in separate units, thus effecting important economies.

It will, of course, be understood that any satisfactory known process for hydroforming naphtha, utilizing the fluidized catalyst technique, may be employed in the present combined processes and, therefore, in the interest of directing attention to applicants' invention a more detailed statement of said hydroforming conditions need not be set forth in greater detail than given above.

In the drawing, only the essential elements necessary to adequately describe the invention have been depicted. It will be understood that in a commercial plant much accessory apparatus, not shown in the drawing, would be included to facilitate the operation of the plant, thus, means for controlling and recording temperature, pressure and flow rate conditions would be included in a commercial plant. Also, pumps and compressors, heat exchangers and other well known equipment would also be employed. Furthermore, standpipes shown in the drawing, such as standpipes 15 and 19, may be provided with gas taps through which small amounts of fluidizing gas may be injected into the standpipe to improve the flowability of the catalyst therein.

Numerous modifications of the present invention may be made by those who are familiar with the present art without departing from the spirit of the present invention.

What is claimed is:

1. The method for hydrofining naphthas containing a substantial amount of diolefins and monoolefins for the purpose of converting a major portion of said diolefins to the corresponding monoolefins without substantial conversion of said monoolefins to the corresponding paraffins which comprises charging a mixture of naphtha vapors at elevated temperatures and pressures to a body of finely divided hydroforming catalyst particles maintained in an elongated, vertical reaction zone, said body of finely divided catalyst particles being formed into a dense, fluidized bed in the lower portion of said reaction zone, maintaining said naphtha in contact with said catalyst in said fluidized bed under hydroforming conditions of temperature, pressure and contact time to effect the desired upgrading thereof, discharging reaction products overhead from said dense fluidized bed with small amounts of catalyst entrained therein thus forming a dilute phase suspension of hydroforming catalyst particles in the upper part of said reaction zone, charging a stream of unstable naphtha containing a substantial amount of diolefins directly into the dilute phase suspension in the upper part of said reaction zone, said stream of unstable naphtha being free of catalyst particles and serving to quench the raw hydroformed products in said dilute phase below hydroforming reaction temperature while maintaining the dilute phase suspension at active hydrofining temperature substantially below that existing in the dense phase whereby diolefins in the unstable naphtha stream are selectively hydrogenated to the corresponding monoolefins and cracking of hydrocarbon components in the dilute phase is avoided.

2. The method set forth in claim 1 in which the said catalyst is molybdenum oxide carried on eta alumina.

3. The method set forth in claim 1 in which a temperature of from about 600°–800° F. is maintained in the said dilute suspension.

4. The method set forth in claim 1 in which the naphtha fed to the said dilute phase suspension is the naphtha produced by coking a high boiling petroleum oil.

References Cited in the file of this patent

UNITED STATES PATENTS

| | | |
|---|---|---|
| 2,293,759 | Penisten | Aug. 25, 1942 |
| 2,695,866 | McGrath | Nov. 30, 1954 |
| 2,706,167 | Harper et al. | Apr. 12, 1955 |
| 2,717,861 | Baumgarten et al. | Sept. 13, 1955 |
| 2,740,750 | Howard | Apr. 3, 1956 |
| 2,773,804 | Tate et al. | Dec. 11, 1956 |